United States Patent [19]

Shay et al.

[11] Patent Number: 4,494,656

[45] Date of Patent: Jan. 22, 1985

[54] DOWN AND STUCK WARE INSPECTION METHOD AND APPARATUS

[75] Inventors: Timothy W. Shay; Mark P. Claypool, both of Horseheads, N.Y.

[73] Assignee: Powers Manufacturing, Inc., Elmira, N.Y.

[21] Appl. No.: 481,176

[22] Filed: Apr. 1, 1983

[51] Int. Cl.³ .......................... B07C 5/00; C03B 35/00
[52] U.S. Cl. ........................................ 209/524; 65/29; 65/158; 250/223 B; 377/53
[58] Field of Search .............................. 209/522–525, 209/579, 586; 65/29, 158; 250/223 R, 223 B; 356/383; 364/473, 478, 507, 555, 559, 569; 377/17, 24, 26, 53

[56] References Cited

U.S. PATENT DOCUMENTS

| | | | |
|---|---|---|---|
| 3,089,594 | 5/1963 | Early | 209/525 |
| 3,248,845 | 5/1966 | Schneider | 250/223 B |
| 3,265,901 | 8/1966 | Schneider | 250/223 B |
| 3,278,023 | 10/1966 | Schneider | 209/525 |
| 3,417,476 | 12/1968 | Martens | 377/24 X |
| 3,433,966 | 3/1969 | Letch et al. | 250/223 B X |
| 3,485,339 | 12/1969 | Miller et al. | 250/223 R X |
| 3,506,840 | 4/1970 | Fink | 250/223 B |
| 3,529,169 | 9/1970 | Heaney et al. | 250/223 B |
| 3,549,890 | 12/1970 | Keller | 250/223 B X |
| 3,573,477 | 4/1971 | Klapes | 250/223 R |
| 3,678,254 | 7/1972 | Graff | 250/223 R X |
| 3,682,554 | 8/1972 | Flaczynski | 356/383 |
| 3,692,980 | 9/1972 | Getker et al. | 377/53 X |
| 3,731,205 | 5/1973 | Gardner | 250/223 B X |
| 3,837,486 | 9/1974 | Gardner | 209/564 |
| 3,968,368 | 7/1976 | Sager | 250/349 X |
| 4,128,892 | 12/1978 | Vasa | 364/569 X |
| 4,253,573 | 3/1981 | Dubberly et al. | 209/525 |
| 4,259,571 | 3/1981 | Dubberly | 250/223 B |
| 4,354,865 | 10/1982 | Poad et al. | 209/525 X |

Primary Examiner—Robert B. Reeves
Assistant Examiner—Edward M. Wacyra
Attorney, Agent, or Firm—Seidel, Gonda & Goldhammer

[57] ABSTRACT

Inspection of a procession of ware such as bottles on a moving conveyor for "down" bottles and bottles which are "stuck" and tilted is accomplished by maintaining an average of detected dimensions for acceptable bottles and by comparing a sensor signal which is indicative of bottle dimension to thresholds which are preselected percentages of the average. Variations in detected bottle dimension, due to different or changing production conditions or variations in conveyor speed, are automatically compensated for.

21 Claims, 5 Drawing Figures

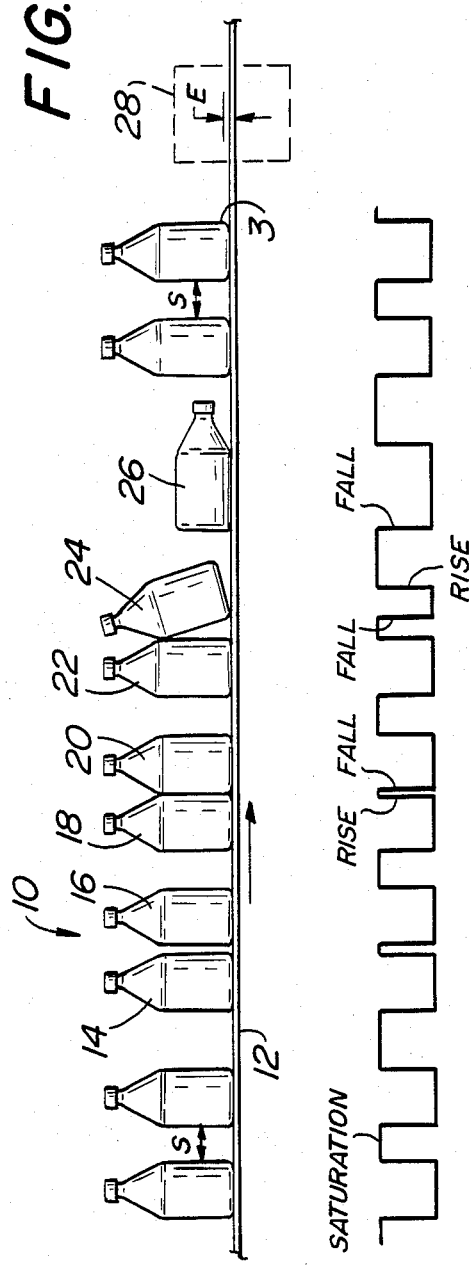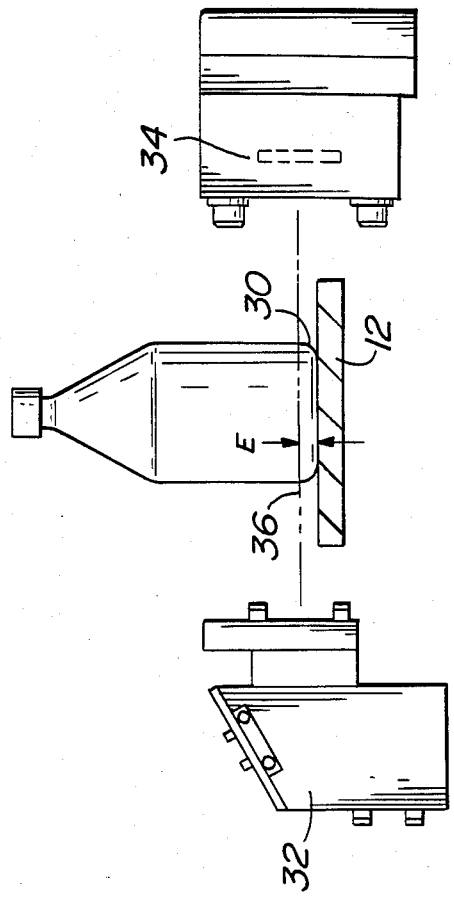

DOWN AND STUCK WARE INSPECTION METHOD AND APPARATUS

BACKGROUND OF THE INVENTION

The present invention is directed to a method and apparatus for inspecting a procession of bottles for relative orientation and spacing. In particular, the invention is directed to method and apparatus for inspecting such bottles for "down" and "stuck" conditions.

The invention is especially important in inspecting for and ejecting "down" and "stuck" bottles at the "hot end" of a glass bottle manufacturing plant between the furnace and the lehr. The invention, however, is also important in inspecting for and ejecting "down" bottles at the "cold end" of the plant downstream of the lehr.

Typically, in a glass bottle manufacturing plant, the bottles are spaced uniformly from each other and arranged in a single file procession on a moving conveyor. The bottles are transported by the conveyor from the furnace to the lehr and then onto various inspection and handling stations. At the "hot end" of the plant, bottles which come into contact with each other may become "stuck" either in an upright or a tilted position. In addition, "down" bottles may be encountered which have fallen on their sides on the conveyor either at the "hot end" or "cold end" of the plant. "Down" and "stuck" bottles must be removed from the conveyor in order to avoid line jams, and contact with good ware, and to reduce processing time.

The heat and dirt encountered in a typical bottle manufacturing plant presents a hostile environment for inspecting a process for "down" and "stuck" bottles, especially by optical devices. Various non-optical devices have been proposed for performing the inspection. For example, U.S. Pat. No. 3,968,368 discloses a heat sensing device for inspecting a procession of hot glass bottles prior to entry in the lehr. The device employs four heat sensing probes rather than optics. The probes are laterally pre-positioned in pairs on upper and lower carriers. Detection of "down" and "stuck" bottles is based on a pre-selected pattern in which the bottles block the heat sensing probes.

Various optical devices have also been proposed for detecting "down" and "stuck" bottles. For example, in U.S. Pat. No. 4,354,865 issued Oct. 19, 1982, there is disclosed a system wherein an infra-red radiant energy source-sensor pair are disposed on opposite sides of a moving conveyor at an elevation such that the radiation beam is interrupted by all ware, whether normal, "down" or "stuck". The sensor produces an output pulse only when the beam is not interrupted. At each detection of a bottle, a one shot generates a pulse of predetermined duration. If the beam is interrupted by a "stuck" bottle or a "down" bottle for a time interval in excess of the duration of the one shot pulse, a logic gate triggers a delay one shot which controls a reject mechanism.

Optical devices have also been proposed for detecting the silhouette of bottles randomly spaced on a moving conveyor. For example, in U.S. Pat. No. 3,837,486 issued Sept. 24, 1974, there is disclosed a system wherein a pulse generator is locked to the moving conveyor so as to obtain a pulse train having a frequency proportional to conveyor speed. A radiation source-sensor pair is arranged at an inspection station so as to generate a "diameter" pulse proportional to the time required by a bottle to transverse the station. The pulse generator pulses are counted within the "diameter" pulse and compared to preset minimum and maximum thresholds. If a count falls between the thresholds, the bottle is accepted. Otherwise, a reject mechanism is operated to remove the bottle from the conveyor.

Heretofore, no optical inspection device has been proposed for detecting "down" and "stuck" bottles based on a comparison to thresholds which automatically vary in proportion to variations in the average dimension of acceptable bottles. Moreover, no optical inspection device has been proposed wherein bottles which are "stuck" upright are detected based on the same sensor signal employed to detect "down" bottles and bottles which are "stuck" and tilted.

An advantage of the invention is that only a single sensor signal is needed to detect all "down" and "stuck" bottles.

A further advantage of the invention is that the detection scheme is substantially insensitive to degrading conditions typically encountered in the bottle manufacturing plant such as wide fluctuations in ambient light, extreme dirt, heat, etc.

A further advangtage of the invention is that the detection of "down" and "stuck" bottles is independent of the overall bottle shape and automatically compensates for changes in conveyor speed as well as physical changes in bottle dimension from procession to procession and within a procession.

A still further advantage of the invention is that the inspection process is carried out using readily available, compact microcomputer and other integrated circuit chips.

Other objects and advangtages of the invention appear hereinafter.

SUMMARY OF THE INVENTION

A procession of bottles is transported on a conveyor past a single light source-sensor pair disposed at an elevation proximate the plane of the conveyor so as to scan the heel portion of each bottle. Successive level transitions in the sensor output due to motion of the bottles past the light-source sensor pair are detected by a programmed microcomputer. The time interval between successive falling and rising transitions defines the bottle dimension along the plane of the light source-sensor pair. The time interval is compared to upper and lower thresholds which vary with changes in conveyor speed as well as changes in bottle dimensions from procession to procession and within a procession. The upper threshold indicates a bottle "down" condition. The lower threshold indicates a cullet or a bottle which is "stuck" and tilted. The time interval between successive rising and falling transitions defines the spacing between bottles. The time interval is compared to a single threshold which is preset and empirically determined beforehand based on conveyor speed and the spacing between normal upright bottles in a procession. The preset threshold indicates a bottle which is "stuck" and upright. Running counts are maintained of the numbers of bottles "stuck" (upright, or tilted), the number of "down" bottles, the number of bottles ejected, the total number of normal or good bottles inspected and the total number of bottles inspected per unit of time (machine speed).

Because the detection technique is sensitive to sensor output level transitions rather than absolute output levels, it is substantially insensitive to environmental conditions which degrade output level. The invention also makes unnecessary multiple light source-sensor pairs which are characteristic of certain conventional inspection techniques.

Although the invention is described in terms of a glass bottle inspection, it should be understood that the invention covers "down" and "stuck" detection of ware in general.

For the purpose of illustrating the invention, there is shown in the drawings a form which is presently preferred; it being understood, however, that this invention is not limited to the precise arrangements and instrumentalities shown.

BRIEF DESCRIPTION OF THE DRAWINGS

FIG. 1 is a diagram of a procession of bottles being transported on a moving conveyor showing the various "down" and "stuck" conditions.

FIG. 2 is a schematic diagram of the single light source-sensor pair having a line of sight at an elevation proximate the top surface of the moving conveyor along the heel portion of a bottle.

FIG. 4 is a diagram of the smoothed and amplified sensor output corresponding to the conditions shown in FIG. 1.

DETAILED DESCRIPTION OF INVENTION

Figure 3:
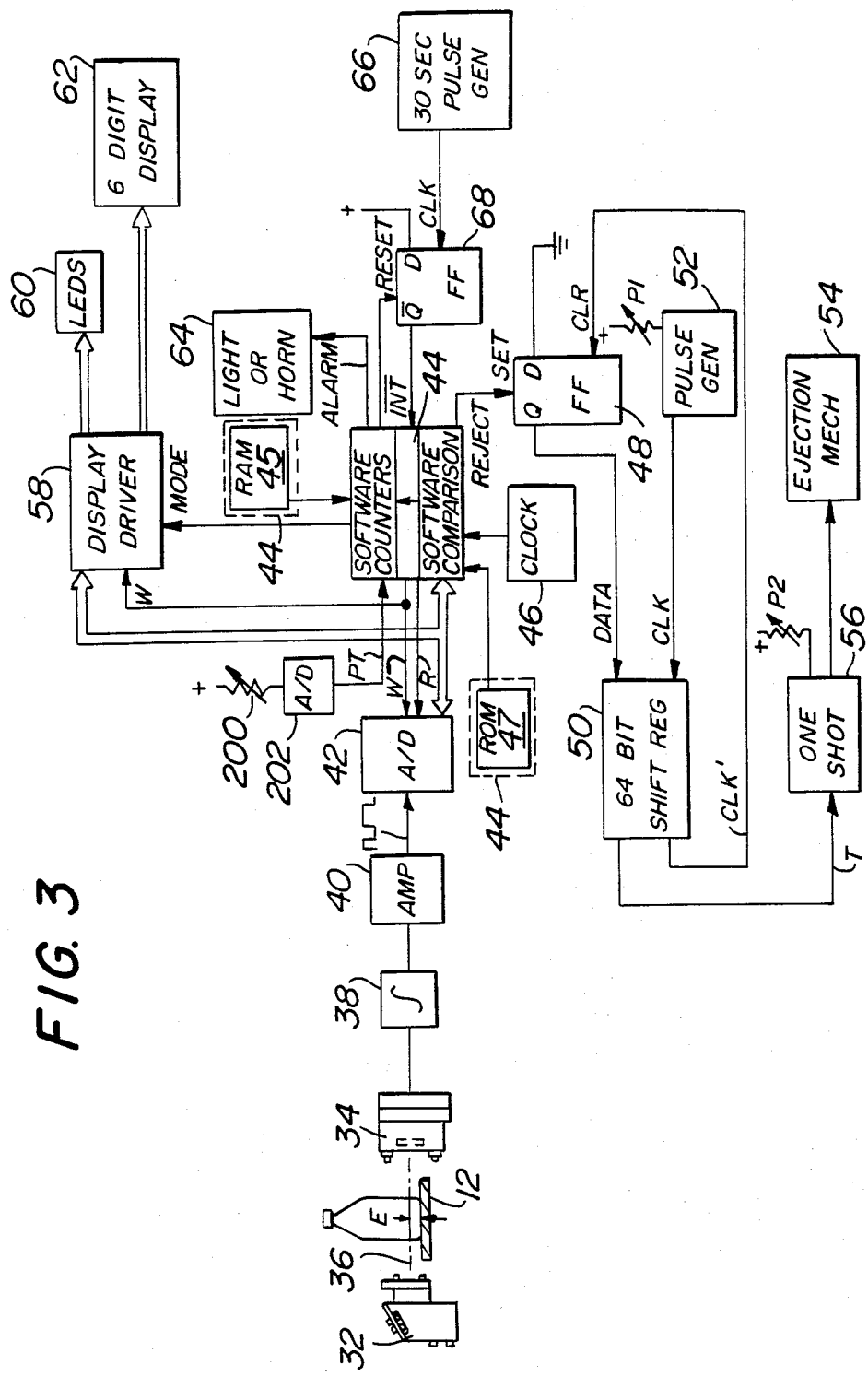
FIG. 3 is a block diagram of the programmed microcomputer and associated electronics.

Referring to the drawings wherein like numerals indicate like elements, there is shown in FIG. 1 a single file procession of ware in the form of glass bottles 10 on a moving conveyor 12. The bottles are uniformly spaced by a nominal distance S in the direction of motion of the conveyor 12. Several abnormal conditions are shown. Bottles 14, 16 are spaced apart less than the distance S but are not "stuck". This condition is tolerable. Bottles 18 and 20 are "stuck" upright. Bottles 22 and 24 are "stuck", bottle 24 being "stuck" and tilted. Bottle 26 is "down". "Down" and "stuck" conditions are not tolerable.

A single light source-sensor pair 28, represented in phantom, is disposed so as to provide a line of sight for a light beam running from the light source to the sensor at an elevation E proximate the top surface of the conveyor. Preferably, the elevation E is coincident with the heel portion of a bottle although higher elevations may also be employed within the scope of invention if it is not necessary to detect bottles "stuck" in an upright position, i.e. if it is only necessary to detect "down" bottles or bottles which are "stuck" and tilted.

The preferred arrangement of the light source-sensor pair 28 is shown more clearly in FIG. 2. The light source is preferably a laser 32 and the sensor comprises a solar cell 34. The laser 32 and solar cell 34 are mounted on opposite sides of the conveyor so as to face each other. The laser and solar cell are adjustably positioned along vertical supports (not shown). The line of sight 36 of the laser beam extends across the path of the bottle procession at an elevation E such that the heel portion 30 of each bottle interrupts the laser beam as the bottle tranverses the line of sight.

Referring to FIG. 3, the output of the sensor 34 is smoothed by an integrator 38 and amplified by an amplifier 40. The integrator and amplifier may be conventional operational amplifier circuits. The amplifier 40 reaches a saturation level when the laser beam is not interrupted by a bottle and remains at a quiescent level when a bottle interrupts the beam. The transitions between quiescent and saturation levels of the amplifier output are shown in FIG. 4 for the conditions depicted in FIG. 1. When a bottle interrupts the laser beam, the beam is blocked or significantly attenuated at the sensor due to refraction, diffusion, etc. through the heel portion 30. The output of the amplifier 40 therefore falls to the quiescent level. The amplifier output rises to the saturation level when the beam is received by the solar cell without interruption.

As can be seen clearly from FIG. 4, the amplifier 40 output is a square wave analog signal which fluctuates between saturation and quiescent levels and, to that extent, may be characterized as a "binary" signal. Referring to FIG. 3, the analog square wave signal generated at the output of amplifier 40 is converted to a multiple bit digital signal by an analog-to-digital (A/D) converter 42. The digital output of A/D converter 42 is an 8 bit digital word which is transmitted to a programmed microcomputer 44. Conversion of the analog signal to digital by the A/D converter 42 is controlled in conventional manner by the write (W) commands generated by the microcomputer 44. Transmission of the digital output of the A/D converter to the microcomputer is controlled in conventional manner by the read (R) commands generated by the microcomputer.

Transitions of the amplifier 40 output between quiescent and saturation levels are detected by the microcomputer by comparing successive digital outputs of the A/D convertor. The duration of a saturation level represents the separation between bottles at the elevation E. The duration of a quiescent level represents the dimension of a bottle along a horizontal plane at the elevation E.

The microcomputer 44 counts pulses generated by a free-running 12.5 Khz clock 46 between successive transitions of opposite sense in the amplifier 40 output. These counts represent the duration of quiescent and saturation levels. Each count is compared to an upper threshold UT, a lower threshold LT, or a preset threshold PT. The upper and lower thresholds are varied from time to time as described more fully hereafter. The upper threshold is used to determine whether a bottle is "down", and the lower threshold is used to determine whether a bottle is "stuck" and tilted.

Initially, the microcomputer stores the counts corresponding to the quiescent levels for a predetermined number of normal bottles such as sixteen. The counts are stored in RAM 45 which is an integral part of the microcomputer. These counts represent the dimensions of sixteen normally formed and positioned bottles along the horizontal plane at the elevation E. The microcomputer computes the average of the counts and stores the average in the RAM 45. The microcomputer then computes the UT threshold by multiplying the average by a factor greater than unity, for example 1.06, which is stored in ROM 47. ROM 47, like RAM 45, is an integral part of the microcomputer. The microcomputer program is itself stored in ROM 47. The microcomputer also computes the LT threshold by multiplying the average by another factor stored in ROM 47 which is less than unity, for example 0.94. The UT and LT thresholds are then temporarily stored in RAM 45.

The store of counts corresponding to the quiescent levels (hence dimensions) of normal or accepted bottles is then updated on a first in first out (FIFO) basis until the old counts have been completely replaced by new counts corresponding to a new group of sixteen normal bottles. Thereafter, the average of the stored counts is re-computed by the microcomputer, and the new average is stored in RAM 45. The UT and LT thresholds are then re-computed as previously described based on the new average. The storage of counts corresponding to quiescent levels of normal or accepted bottles, the computation of the average of the stored counts, and the computation of the UT and LT thresholds is repeated throughout the inspection process as described above.

Each count corresponding to a quiescent level or bottle dimension is compared to the UT and LT thresholds to determine whether a bottle should be accepted or rejected. If the count falls between the UT and LT thresholds, this indicates that the bottle is normal, i.e. normally formed and positioned and can be accepted. Accordingly, the microcomputer stores the count in RAM 45 in replacement of the oldest stored count. If the count exceeds the UT threshold, this indicates a "down" bottle and the microcomputer generates a reject signal as described hereafter and does not store the count in RAM. Similarly, if the count falls below the LT threshold, this indicates a bottle "stuck" and tilted and the microcomputer generates a reject signal and does not store the count in RAM. Thus, only counts corresponding to normal or accepted bottles are stored in RAM and used to compute the average.

Each count corresponding to the duration of a saturation level of the amplifier 40 output represents the separation between bottles along the horizontal plane at the elevation E. The count is not stored in RAM by the microcomputer since it is not pertinent to the computation of the average on which the UT and LT thresholds are based. Each such count is compared by the microcomputer to the PT threshold. The PT threshold is an operator presettable threshold which represents the minimum permissible spacing between adjacent upright bottles. The PT threshold is selected by setting a potentiometer 200 to the desired level. See FIG. 3. An A/D converter 202 converts the potentiometer signal to a digital signal which represents the PT threshold. The signal is received by the microcomputer 44. The microcomputer determines whether a count corresponding to the duration of a saturation level falls below the PT threshold. If it does, this indicates a pair of bottles which are stuck "upright", and the microcomputer generates a reject signal.

A reject signal is therefore generated by the microprocessor 44 if any one of three events occurs:

(1) The pulse count between successive falling and rising transitions in the amplifier 40 output exceeds the UT threshold, (2) The pulse count between successive falling and rising transitions in the amplifier 40 output falls below the LT threshold, or (3) The pulse count between successive rising and falling transitions in the amplifier 40 output falls below the PT threshold. The conditions are best understood from a visual inspection of FIGS. 1 and 4.

Referring again to FIG. 3, a reject signal generated by the microprocessor sets a D-type flip flop 48. The Q output of flip flop 48 is clocked through a 64 bit shift register 50 at the pulse repetition frequency (prf) of a pulse train which is generated by a variable prf pulse generator 52. The prf control for the pulse generator is a conventional potentiometer P1. The flip-flop 48 is cleared by the CLK' output of shift register 50 after each entry into the shift register, i.e., at the prf of the pulse train output of generator 52, to prepare the flip-flop for the next reject. The prf of the pulse train and the number of stages of the shift register 50 determine the time delay encountered in shifting the Q output of flip-flop 48 to the T output of the shift register. After the prescribed time delay, the T output of the shift register triggers a pulse generator or one shot 56. The one shot 56 generates a pulse having a variable width as set by a conventional potentiometer P2. The ejection mechanism 54 is activated by the pulse output of the one shot for the full pulse duration.

The time delay effected by the shift register 50 is chosen to match the time required for the conveyor 12 to transport a bottle from the location of the light source-sensor pair 28 to the downstream location of the ejection mechanism 54. The ejection mechanism 54 may be a conventional pneumatic device which removes a rejected bottle from the procession by directing a blast of air at the bottle. The duration of the air blast depends on the width of the pulse generated by one shot 56 which in turn depends on the nature of the bottles. Thus, one shot 56 is set by means of the potentiometer P2 to generate a longer pulse for heavier bottles and a shorter pulse for lighter bottles.

The microcomputer 44 is programmed to maintain a running count of various events such as (a) the numbers of bottles "stuck" upright and tilted, (b) the number of "down" bottles, (c) the number of bottles rejected, (d) the total number of normal bottles inspected, and (e) the total number of bottles inspected per minute. Each of (a)–(e) above are counts fed by the microcomputer via a display driver 58 to a 6 digit display 62 which displays the count. The microcomputer also maintains a count of the number of bottles consecutively rejected, but this count is not displayed.

Thus, if the LT or PT threshold has not been reached, the microcomputer increments a software counter (by two) so as to count the number of bottles "stuck" tilted or upright. If the UT threshold is exceeded, the microcomputer increments a software counter so as to count the number of bottles "down". If a count (duration of quiescent level) exceeds the UT threshold or falls below the LT threshold, or if a count (duration of saturation level) falls below the PT threshold, the microcomputer generates a reject signal as previously described and increments a software counter (by two if the LT or PT threshold has not been reached—indicating a pair of "stuck" bottles) so as to count the total number of rejects. Each time that a count (duration of quiescent level) falls between the UT and LT thresholds, and each time that a count (duration of saturation level) reaches the PT threshold, the microcomputer increments a software counter so as to count the number of normal bottles inspected. Moreover, each time that a "bottle sense" condition is detected as described hereinafter, the microcomputer increments a software counter so as to count the total number of bottles inspected. And for any reject condition, the microcomputer increments a software counter which counts the number of consecutive instances in which a reject condition has occurred. This counter, however, is cleared by the microcomputer whenever a normal bottle is inspected, that is, whenever a count (duration of quiescent level) falls between the UT and LT thresholds and whenever a count (duration of saturation level) exceeds the PT threshold.

The microcomputer 44 is also programmed to compute the total number of bottles inspected per minute based on the count of the total number of bottles inspected and successive interrupt pulses received from a 30 second pulse generator 66. See FIG. 3. The pulse generator produces a pulse train having a 30 second period. The pulse train clocks a D-type flip flop 68. The Q output of flip flop 68 is fed to the interrupt (INT) input of the microcomputer 44. Upon detecting an interrupt pulse, the microcomputer multiplies the count of total number of bottles inspected since reception of the last interrupt pulse by 2 to derive the total number of bottles inspected per minute. At the end of each 30 second period, the microcomputer clears the flip flop 68 in preparation for a new computation.

Figure 5:
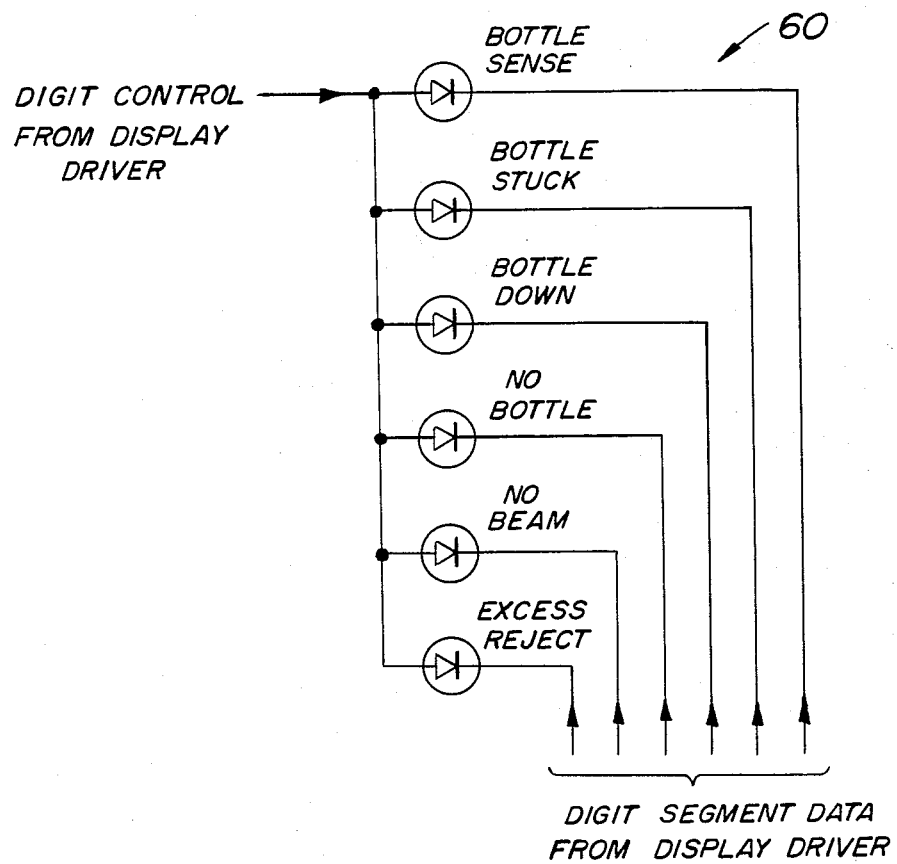
FIG. 5 is a diagram of the LED warning devices shown in block form in FIG. 3.

A bank of LEDs 60 preferably comprising 6 LEDs are also connected to the display driver as shown in FIGS. 3 and 5. Each LED indicates whether a bottle is being sensed ("bottle sense"), whether a bottle is "stuck" ("bottle stuck"), whether a bottle is "down" ("bottle down"), whether there is no bottle for a predetermined period of time at the light source-sensor pair 28 ("no bottle"), whether no beam has been received by the sensor for a predetermined period of time, ("no beam"), and whether an excessive number of consecutive rejects have been detected ("excess reject"). Each of these conditions is detected by the microprocessor 44 as described in further detail hereafter.

The microcomputer determines a "bottle sense" condition, i.e. that a bottle is being sensed at the light source-sensor pair 28, whenever the sensor 34 output results in a falling transition at the amplifier 40 output. The microprocessor detects a "bottle stuck" condition when the count between successive falling and rising transitions in the amplifier 40 output (duration of quiescent level) falls below the LT threshold or when the count between successive rising and falling transitions in the amplifier 40 output (duration of saturation level) falls below the PT threshold. The microcomputer detects a "no bottle" condition when the count of clock 46 pulses following a rising transition in the amplifier 40 output exceeds a predetermined number which is stored in ROM and is representative of the maximum permissible spacing between adjacent bottles. The microcomputer detects a "no beam" condition when the count following a falling transition in the amplifier 40 output exceeds a preset number stored in ROM which is in excess of the UT threshold and which represents the absence of a bottle at a location in the procession at which a bottle is expected to be present. The microcomputer determines an "excess reject" condition when the count of the number of consecutive rejects exceeds a preset number stored in ROM. Upon determining any of these conditions, the microcomputer excites an appropriate LED 60 via the display driver.

In addition, upon detecting an alarm condition such as "no bottle", "no beam" or "excess reject", the microcomputer 44 generates an alarm signal which activates an alarm device 64 such as a whirling light or a horn. See FIG. 3.

The microcomputer program for performing each of the functions described herein is stored in ROM 47, as previously indicated, and a copy of the program in source code is appended to this specification.

The present invention may be embodied in other specific forms without departing from the spirit or essential attributes thereof and, accordingly, reference should be made to the appended claims, rather than to the foregoing specification, as indicating the scope of the invention.

| LINE | SOURCE STATEMENT |
|------|------------------|
| 1    |                  |
| 2    |                  |
| 3    |                  |
| 4    |                  |
| 5    |                  |
| 6    |                  |
| 7    |                  |
| 8    |                  |
| 9    |                  |
| 10   |                  |
| 11   |                  |
| 12   |                  |
| 13   |                  |
| 14   |                  |
| 15   |                  |
| 16   |                  |
| 17   |                  |
| 18   |                  |
| 19   |                  |
| 20   |                  |
| 21   |                  |
| 22   |                  |
| 23   |                  |
| 24   |                  |
| 25   |                  |
| 26   |                  |
| 27   |                  |
| 28   |                  |
| 29   |                  |
| 30   |                  |
| 31   |                  |
| 32   |                  |
| 33   |                  |
| 34   |                  |
| 35   |                  |
| 36   |                  |
| 37   |                  |
| 38   |                  |
| 39   |                  |
| 40   |                  |
| 41   |                  |
| 42   |                  |
| 43   |                  |
| 44   |                  |
| 45   |                  |
| 46   |                  |
| 47   |                  |
| 48   |                  |
| 49   |                  |
| 50   |                  |
| 51   |                  |
| 52   |                  |
| 53   |                  |
| 54   |                  |

| LINE | SOURCE STATEMENT | | LINE | | SOURCE STATEMENT | |
|---|---|---|---|---|---|---|
| 55 | | | 109 | | MOV | A, R3 |
| 56 | | | 110 | | JZ | DECDON |
| 57 | | | 111 | | DEC | R3 |
| 58 | | | 112 | DECDON: | | |
| 59 | | | 113 | | SEL | RB1 |
| 60 | | | 114 | | MOV | A, R7 |
| 61 | | | 115 | | SEL | RB0 |
| 62 | | | 116 | | RETR | |
| 63 | | | 117 | | | |
| 64 | | | 118 | RPMINT: | | |
| 65 | | | 119 | | ORL | P2, #80H |
| 66 | | | 120 | | SEL | RB1 |
| 67 | | | 121 | | MOV | R7, A |
| 68 | | | 122 | | MOV | R0, #59 |
| 69 | | | 123 | | MOV | R1, #46 |
| 70 | | | 124 | | MOV | A, @R0 |
| 71 | | | 125 | | ADD | A, @R0 |
| 72 | | | 126 | | DA | A |
| 73 | ; | | 127 | | MOV | @R1, A |
| | | | 128 | | CLR | A |
| 74 | ORG | 000H | 129 | | MOV | @R0, A |
| 75 | RESET: | | 130 | | INC | R0 |
| 76 | JMP | POWRUP | 131 | | INC | R1 |
| 77 | | | 132 | | MOV | A, @R0 |
| 78 | ORG | 003H | 133 | | ADDC | A, @R0 |
| 79 | SPEED: | | 134 | | DA | A |
| 80 | JMP | RPMINT | 135 | | MOV | @R1, A |
| 81 | | | 136 | | CLR | A |
| 82 | ORG | 007H | 137 | | MOV | @R0, A |
| 83 | CLOCK: | | 138 | | CLR | F1 |
| 84 | SEL | RB1 | 139 | | CPL | F1 |
| 85 | MOV | R7, A | 140 | | MOV | R0, #125 |
| 86 | MOV | R0, #61 | 141 | | MOV | A, @R0 |
| 87 | MOV | A, @R0 | 142 | | JZ | NOMINT |
| 88 | ADD | A, #1 | 143 | | CLR | A |
| 89 | MOV | @R0, A | 144 | | MOV | @R0, A |
| 90 | INC | R0 | 145 | | INC | R0 |
| 91 | MOV | A, @R0 | 146 | | MOV | A, @R0 |
| 92 | ADDC | A, #0 | 147 | | ADD | A, #1 |
| 93 | MOV | @R0, A | 148 | | DA | A |
| 94 | SEL | RB0 | 149 | | MOV | @R0, A |
| 95 | JZ | DISDEC | 150 | | INC | R0 |
| 96 | MOV | A, R7 | 151 | | MOV | A, @R0 |
| 97 | JB5 | BEAM | 152 | | ADDC | A, #0 |
| 98 | WARE: | | 153 | | DA | A |
| 99 | ORL | A, #08H | 154 | | MOV | @R0, A |
| 100 | JMP | ALMDON | 155 | | JMP | MINTIN |
| 101 | BEAM: | | 156 | NOMINT: | | |
| 102 | ORL | A, #02H | 157 | | MOV | A, #1 |
| 103 | ALMDON: | | 158 | | MOV | @R0, A |
| 104 | MOV | R7, A | 159 | MINTIN: | | |
| 105 | CLR | F1 | 160 | | MOV | A, R7 |
| 106 | CPL | F1 | 161 | | SEL | RB0 |
| 107 | ANL | P2, #0F7H | 162 | | ANL | P2, #7FH |
| 108 | DISDEC: | | 163 | | RETR | |

| LINE | SOURCE STATEMENT | | LINE | SOURCE STATEMENT | |
|---|---|---|---|---|---|
| 164 | | | 219 | NORES: | |
| 165 | TIMRES: | | 220 | MOV | A,R3 |
| 166 | CLR | A | 221 | JNZ | ADWAIT |
| 167 | MOV | T,A | 222 | JF1 | DISPCL |
| 168 | STRT | T | 223 | IN | A,P1 |
| 169 | MOV | R0,#61 | 224 | ANL | A,#0F0H |
| 170 | MOV | @R0,A | 225 | MOV | R0,#63 |
| 171 | INC | R0 | 226 | XCH | A,@R0 |
| 172 | MOV | @R0,A | 227 | XRL | A,@R0 |
| 173 | EN | TCNTI | 228 | JNZ | DISPCL |
| 174 | RET | | 229 | ADWAIT: | |
| 175 | | | 230 | IN | A,P1 |
| 176 | POWRUP: | | 231 | JB1 | ADWAIT |
| 177 | SEL | RB0 | 232 | ANL | P2,#0FDH |
| 178 | CALL | CNTRES | 233 | INS | A,BUS |
| 179 | CALL | TIMRES | 234 | JNZ | READOK |
| 180 | MOV | R0,#58 | 235 | MOV | A,#01 |
| 181 | MOV | @R0,#16 | 236 | READOK: | |
| 182 | CLR | A | 237 | ORL | P2,#02H |
| 183 | MOV | R7,A | 238 | ORL | P1,#04H |
| 184 | MOV | R3,A | 239 | RET | |
| 185 | MOV | R0,#46 | 240 | DISPCL: | |
| 186 | MOV | @R0,A | 241 | CALL | DISPLY |
| 187 | INC | R0 | 242 | JMP | ADWAIT |
| 188 | MOV | @R0,A | 243 | | |
| 189 | MOV | R0,#59 | 244 | STKDWN: | |
| 190 | MOV | @R0,A | 245 | ADD | A,@R0 |
| 191 | INC | R0 | 246 | DA | A |
| 192 | MOV | @R0,A | 247 | MOV | @R0,A |
| 193 | MOV | R0,#63 | 248 | INC | R0 |
| 194 | IN | A,P1 | 249 | MOV | A,@R0 |
| 195 | ANL | A,#0F0H | 250 | ADDC | A,#0 |
| 196 | MOV | @R0,A | 251 | DA | A |
| 197 | MOV | A,#1BH | 252 | MOV | @R0,A |
| 198 | OUTL | P2,A | 253 | MOV | R0,#38 |
| 199 | ANL | P1,#0F3H | 254 | MOV | A,R7 |
| 200 | ORL | P1,#04H | 255 | JB4 | STKBIT |
| 201 | EN | I | 256 | ORL | P2,#40H |
| 202 | JMP | SETUP | 257 | MOV | A,#1 |
| 203 | | | 258 | JMP | BITSOK |
| 204 | LASER: | | 259 | STKBIT: | |
| 205 | ANL | P1,#0FBH | 260 | ANL | P2,#0DFH |
| 206 | ORL | P1,#08H | 261 | MOV | A,#2 |
| 207 | MOV | R6,#20 | 262 | BITSOK: | |
| 208 | DELAY: | | 263 | ADD | A,@R0 |
| 209 | DJNZ | R6,DELAY | 264 | DA | A |
| 210 | ANL | P1,#0F7H | 265 | MOV | @R0,A |
| 211 | ANL | P2,#0FDH | 266 | INC | R0 |
| 212 | CLR | A | 267 | MOV | A,@R0 |
| 213 | MOVX | @R0,A | 268 | ADDC | A,#0 |
| 214 | ORL | P2,#02H | 269 | DA | A |
| 215 | JT1 | NORES | 270 | MOV | @R0,A |
| 216 | CALL | CNTRES | 271 | INC | R0 |
| 217 | CLR | F1 | 272 | MOV | A,@R0 |
| 218 | CPL | F1 | 273 | ADDC | A,#0 |

| LINE | SOURCE STATEMENT | | LINE | SOURCE STATEMENT | |
|---|---|---|---|---|---|
| 274 | DA | A | 329 | MOV | @R0,#12H |
| 275 | MOV | @R0,A | 330 | JMP | PRCT12 |
| 276 | MOV | R0,#58 | 331 JUMP06: | | |
| 277 | MOV | A,@R0 | 332 | ORL | P1,#80H |
| 278 | DEC | A | 333 | MOV | @R0,#06H |
| 279 | MOV | @R0,A | 334 | JMP | PRCT06 |
| 280 | JNZ | NOEXC | 335 | | |
| 281 | MOV | @R0,#1 | 336 | | |
| 282 | MOV | A,R7 | 337 | | |
| 283 | ORL | A,#04H | 338 SETUP: | | |
| 284 | MOV | R7,A | 339 | MOV | R1,#64 |
| 285 | ANL | P2,#0F7H | 340 | CLR | F1 |
| 286 NOEXC: | | | 341 | CPL | F1 |
| 287 | CLR | F1 | 342 | CLR | F0 |
| 288 | CPL | F1 | 343 | CPL | F0 |
| 289 | RET | | 344 | CALL | LASER |
| 290 | | | 345 | MOV | R2,A |
| 291 AVRAGE: | | | 346 SEQNCE: | | |
| 292 | CLR | A | 347 | CALL | LASER |
| 293 | MOV | R4,A | 348 | MOV | R6,A |
| 294 | MOV | R5,A | 349 | CPL | A |
| 295 | MOV | R6,A | 350 | INC | A |
| 296 | MOV | R0,#64 | 351 | ADD | A,R2 |
| 297 AVRG1: | | | 352 | JC | LOWER |
| 298 | MOV | A,R4 | 353 HIGHER: | | |
| 299 | ADD | A,@R0 | 354 | CPL | A |
| 300 | MOV | R4,A | 355 | ANL | A,#0E0H |
| 301 | INC | R0 | 356 | JZ | SEQNCE |
| 302 | MOV | A,R5 | 357 | CALL | LASER |
| 303 | ADDC | A,@R0 | 358 | CALL | HICOMP |
| 304 | MOV | R5,A | 359 | JZ | SEQNC1 |
| 305 | MOV | A,R6 | 360 | CPL | A |
| 306 | ADDC | A,#0 | 361 | JZ | SEQNCE |
| 307 | MOV | R6,A | 362 | MOV | A,R6 |
| 308 | INC | R0 | 363 | MOV | R2,A |
| 309 | MOV | A,R0 | 364 | CALL | TIMRES |
| 310 | XRL | A,#96 | 365 | JMP | SPACE |
| 311 | JNZ | AVRG1 | 366 SEQNC1: | | |
| 312 | CALL | DIVID2 | 367 | MOV | A,R6 |
| 313 | CALL | DIVID2 | 368 | MOV | R2,A |
| 314 | CALL | DIVID2 | 369 | JMP | SEQNCE |
| 315 | CALL | DIVID2 | 370 LOWER: | | |
| 316 | MOV | R0,#124 | 371 | ANL | A,#0E0H |
| 317 | MOV | @R0,#0 | 372 | JZ | SEQNCE |
| 318 | DEC | R0 | 373 | CALL | LASER |
| 319 | ANL | P1,#7FH | 374 | CALL | LOCOMP |
| 320 | IN | A,P1 | 375 | JZ | SEQNC1 |
| 321 | JB7 | JUMP06 | 376 | CPL | A |
| 322 | ORL | P1,#80H | 377 | JZ | SEQNCE |
| 323 | IN | A,P1 | 378 | MOV | A,R6 |
| 324 | JB7 | JUMP12 | 379 | MOV | R2,A |
| 325 JUMP25: | | | 380 | CALL | TIMRES |
| 326 | MOV | @R0,#25H | 381 SETNEW: | | |
| 327 | JMP | PRCT25 | 382 | ANL | P2,#0EFH |
| 328 JUMP12: | | | 383 | MOV | A,R7 |

| LINE | SOURCE STATEMENT | | LINE | SOURCE STATEMENT | |
|---|---|---|---|---|---|
| 384 | ORL | A,#20H | 439 | JZ | SETNWX |
| 385 | ANL | A,#0E6H | 440 SETNW5: | | |
| 386 | MOV | R7,A | 441 | CALL | LASER |
| 387 | CLR | F1 | 442 | CALL | HICOMP |
| 388 | CPL | F1 | 443 | JZ | SETNWX |
| 389 | JB2 | SETNWX | 444 | CPL | A |
| 390 | ORL | P2,#08H | 445 | JZ | SETNWX |
| 391 SETNWX: | | | 446 SETNW6: | | |
| 392 | JT0 | SETUP | 447 | MOV | A,R6 |
| 393 | CALL | LASER | 448 | MOV | R2,A |
| 394 | CALL | HICOMP | 449 | STOP | TCNT |
| 395 | CPL | A | 450 | DIS | TCNTI |
| 396 | JZ | SETNWX | 451 | MOV | A,R7 |
| 397 | CPL | A | 452 | JB1 | BOTBAD |
| 398 | JNZ | SETNW1 | 453 | MOV | A,T |
| 399 SETN1: | | | 454 | MOV | @R1,A |
| 400 | CALL | LASER | 455 | INC | R1 |
| 401 | CALL | HICOMP | 456 | MOV | R0,#61 |
| 402 | CPL | A | 457 | MOV | A,@R0 |
| 403 | JZ | SETNWX | 458 | MOV | @R1,A |
| 404 | CPL | A | 459 | INC | R1 |
| 405 | JNZ | SETNW1 | 460 | CALL | TIMRES |
| 406 SETN2: | | | 461 | MOV | A,R1 |
| 407 | CALL | LASER | 462 | XRL | A,#96 |
| 408 | CALL | HICOMP | 463 | JNZ | SPCJMP |
| 409 | CPL | A | 464 | MOV | R1,#64 |
| 410 | JZ | SETNWX | 465 | CALL | AVRAGE |
| 411 | CPL | A | 466 | CLR | F0 |
| 412 | JNZ | SETNW1 | 467 | CLR | F1 |
| 413 | MOV | A,R6 | 468 | CPL | F1 |
| 414 | MOV | R2,A | 469 SPCJMP | | |
| 415 | JMP | SETNWX | 470 | JMP | SPACE |
| 416 SETNW1: | | | 471 BOTBAD: | | |
| 417 | CALL | LASER | 472 | CALL | TIMRES |
| 418 | CALL | HICOMP | 473 | JMP | SPACE |
| 419 | JZ | SETNWX | 474 | | |
| 420 | CPL | A | 475 | ORG | 200H |
| 421 | JZ | SETNWX | 476 | | |
| 422 SETNW2: | | | 477 NORMAL | | |
| 423 | CALL | LASER | 478 | ANL | P2,#0EFH |
| 424 | CALL | HICOMP | 479 | MOV | A,R7 |
| 425 | JZ | SETNWX | 480 | ORL | A,#20H |
| 426 | CPL | A | 481 | ANL | A,#0E6H |
| 427 | JZ | SETNWX | 482 | MOV | R7,A |
| 428 SETNW3: | | | 483 | JB2 | NORMLY |
| 429 | CALL | LASER | 484 | ORL | P2,#08H |
| 430 | CALL | HICOMP | 485 NORMLY: | | |
| 431 | JZ | SETNWX | 486 | MOV | R0,#59 |
| 432 | CPL | A | 487 | MOV | A,@R0 |
| 433 | JZ | SETNWX | 488 | ADD | A,#1 |
| 434 SETNW4: | | | 489 | DA | A |
| 435 | CALL | LASER | 490 | MOV | @R0,A |
| 436 | CALL | HICOMP | 491 | INC | R0 |
| 437 | JZ | SETNWX | 492 | MOV | A,@R0 |
| 438 | CPL | A | 493 | ADDC | A,#0 |

| LINE | SOURCE STATEMENT | | LINE | SOURCE STATEMENT | |
|---|---|---|---|---|---|
| 494 | DA | A | 549 | CALL | HICOMP |
| 495 | MOV | @R0,A | 550 | JZ | NORMLX |
| 496 NORMLX: | | | 551 | CPL | A |
| 497 | JNT0 | NORJMP | 552 | JZ | NORMLX |
| 498 | JMP | SETUP | 553 NORML6: | | |
| 499 NORJMP: | | | 554 | MOV | A,R6 |
| 500 | CALL | LASER | 555 | MOV | R2,A |
| 501 | CALL | HICOMP | 556 | MOV | R0,#44 |
| 502 | CPL | A | 557 | STOP | TCNT |
| 503 | JZ | NORMLX | 558 | DIS | TCNTI |
| 504 | CPL | A | 559 | MOV | A,R7 |
| 505 | JNZ | NORML1 | 560 | JB1 | NRMBAD |
| 506 NORL1: | | | 561 | JMP | INTIME |
| 507 | CALL | LASER | 562 NRMBAD: | | |
| 508 | CALL | HICOMP | 563 | CALL | TIMRES |
| 509 | CPL | A | 564 | JMP | SPACE |
| 510 | JZ | NORMLX | 565 INTIME: | | |
| 511 | CPL | A | 566 | MOV | A,T |
| 512 | JNZ | NORML1 | 567 | MOV | @R0,A |
| 513 NORL2: | | | 568 | MOV | R0,#32 |
| 514 | CALL | LASER | 569 | MOV | @R0,A |
| 515 | CALL | HICOMP | 570 | MOV | R0,#61 |
| 516 | CPL | A | 571 | MOV | A,@R0 |
| 517 | JZ | NORMLX | 572 | MOV | R0,#45 |
| 518 | CPL | A | 573 | MOV | @R0,A |
| 519 | JNZ | NORML1 | 574 | MOV | R0,#33 |
| 520 | MOV | A,R6 | 575 | MOV | @R0,A |
| 521 | MOV | R2,A | 576 | CALL | TIMRES |
| 522 | JMP | NORMLX | 577 | CALL | TWOCPL |
| 523 NORML1: | | | 578 | MOV | A,@R0 |
| 524 | CALL | LASER | 579 | ADD | A,R4 |
| 525 | CALL | HICOMP | 580 | MOV | @R0,A |
| 526 | JZ | NORMLX | 581 | INC | R0 |
| 527 | CPL | A | 582 | MOV | A,@R0 |
| 528 | JZ | NORMLX | 583 | ADDC | A,R5 |
| 529 NORML2: | | | 584 | MOV | @R0,A |
| 530 | CALL | LASER | 585 | DEC | R0 |
| 531 | CALL | HICOMP | 586 | JC | STKCHK |
| 532 | JZ | NORMLX | 587 | JMP | DWNCHK |
| 533 | CPL | A | 588 STKCHK: | | |
| 534 | JZ | NORMLX | 589 | CALL | TWOCPL |
| 535 NORML3: | | | 590 | MOV | A,@R0 |
| 536 | CALL | LASER | 591 | MOV | R0,#56 |
| 537 | CALL | HICOMP | 592 | ADD | A,@R0 |
| 538 | JZ | NORMLX | 593 | MOV | R0,#45 |
| 539 | CPL | A | 594 | MOV | A,@R0 |
| 540 | JZ | NORMLX | 595 | MOV | R0,#57 |
| 541 NORML4: | | | 596 | ADDC | A,@R0 |
| 542 | CALL | LASER | 597 | JNC | STUCK1 |
| 543 | CALL | HICOMP | 598 | JMP | GOOD |
| 544 | JZ | NORMLX | 599 STUCK1: | | |
| 545 | CPL | A | 600 | MOV | R0,#36 |
| 546 | JZ | NORMLX | 601 | MOV | A,R7 |
| 547 NORML5: | | | 602 | ORL | A,#10H |
| 548 | CALL | LASER | 603 | MOV | R7,A |

| LINE | SOURCE STATEMENT | | LINE | SOURCE STATEMENT | |
|---|---|---|---|---|---|
| 604 | MOV | A,#2 | 659 | MOV | @R0,A |
| 605 | CALL | STKDWN | 660 | INC | R0 |
| 606 | JMP | SPACE | 661 | MOV | A,@R0 |
| 607 | | | 662 | ADDC | A,#0 |
| 608 DWNCHK: | | | 663 | DA | A |
| 609 | MOV | A,@R0 | 664 | MOV | @R0,A |
| 610 | MOV | R0,#56 | 665 | CLR | F1 |
| 611 | ADD | A,@R0 | 666 | CPL | F1 |
| 612 | MOV | R0,#45 | 667 | JMP | SPACE |
| 613 | MOV | A,@R0 | 668 | | |
| 614 | MOV | R0,#57 | 669 SPACE: | | |
| 615 | ADDC | A,@R0 | 670 | MOV | A,R7 |
| 616 | JNC | DOWN1 | 671 | ANL | A,#11H |
| 617 | JMP | GOOD | 672 | JZ | SPACEY |
| 618 DOWN1: | | | 673 | ORL | P2,#04H |
| 619 | MOV | R0,#34 | 674 SPACEY: | | |
| 620 | MOV | A,R7 | 675 | MOV | A,R7 |
| 621 | ORL | A,#01H | 676 | ANL | A,#0DDH |
| 622 | MOV | R7,A | 677 | MOV | R7,A |
| 623 | MOV | A,#1 | 678 | CLR | F1 |
| 624 | CALL | STKDWN | 679 | CPL | F1 |
| 625 | JMP | SPACE | 680 | ORL | P2,#10H |
| 626 | | | 681 | ANL | P2,#0FBH |
| 627 | | | 682 | JB2 | SPACEX |
| 628 | | | 683 | ORL | P2,#08H |
| 629 GOOD: | | | 684 SPACEX: | | |
| 630 | MOV | R0,#58 | 685 | JNT0 | SPACEZ |
| 631 | MOV | @R0,#16 | 686 | JMP | SETUP |
| 632 | MOV | A,R7 | 687 SPACEZ: | | |
| 633 | ANL | A,#0FBH | 688 | CALL | LASER |
| 634 | MOV | R7,A | 689 | CALL | LOCOMP |
| 635 | ORL | P2,#08H | 690 | CPL | A |
| 636 | MOV | R0,#32 | 691 | JZ | SPACEX |
| 637 | MOV | A,@R0 | 692 | CPL | A |
| 638 | MOV | @R1,A | 693 | JNZ | SPACE1 |
| 639 | INC | R0 | 694 SPCE1: | | |
| 640 | INC | R1 | 695 | CALL | LASER |
| 641 | MOV | A,@R0 | 696 | CALL | LOCOMP |
| 642 | MOV | @R1,A | 697 | CPL | A |
| 643 | INC | R1 | 698 | JZ | SPACEX |
| 644 | MOV | A,R1 | 699 | CPL | A |
| 645 | XRL | A,#96 | 700 | JNZ | SPACE1 |
| 646 | JNZ | AVCALL | 701 SPCE2: | | |
| 647 | MOV | R1,#64 | 702 | CALL | LASER |
| 648 AVCALL: | | | 703 | CALL | LOCOMP |
| 649 | CALL | AVRAGE | 704 | CPL | A |
| 650 | MOV | R0,#41 | 705 | JZ | SPACEX |
| 651 | MOV | A,@R0 | 706 | CPL | A |
| 652 | ADD | A,#1 | 707 | JNZ | SPACE1 |
| 653 | DA | A | 708 | MOV | A,R6 |
| 654 | MOV | @R0,A | 709 | MOV | R2,A |
| 655 | INC | R0 | 710 | JMP | SPACEX |
| 656 | MOV | A,@R0 | 711 SPACE1: | | |
| 657 | ADDC | A,#0 | 712 | CALL | LASER |
| 658 | DA | A | 713 | CALL | LOCOMP |

| LINE | SOURCE STATEMENT | | LINE | SOURCE STATEMENT | |
|---|---|---|---|---|---|
| 714 | JZ | SPACEX | 824 LEAVE: | | |
| 715 | CPL | A | 825 | RET | |
| 716 | JZ | SPACEX | 826 | | |
| 717 SPACE2: | | | 827 LOCOMP: | | |
| 718 | CALL | LASER | 828 | MOV | R6,A |
| 719 | CALL | LOCOMP | 829 | CPL | A |
| 720 | JZ | SPACEX | 830 | ADD | A,#1 |
| 721 | CPL | A | 831 | ADDC | A,R2 |
| 722 | JZ | SPACEX | 832 | JC | LLOGIC |
| 723 SPACE3: | | | 833 | CLR | A |
| 724 | CALL | LASER | 834 | RET | |
| 725 | CALL | LOCOMP | 835 LLOGIC: | | |
| 726 | JZ | SPACEX | 836 | ANL | A,#0E0H |
| 727 | CPL | A | 837 | JNZ | LEAVE1 |
| 728 | JZ | SPACEX | 838 | CPL | A |
| 729 SPACE4: | | | 839 LEAVE1: | | |
| 730 | CALL | LASER | 840 | RET | |
| 731 | CALL | LOCOMP | 841 | | |
| 732 | JZ | SPACEX | 842 TWOCPL: | | |
| 733 | CPL | A | 843 | MOV | R0,#44 |
| 734 | JZ | SPACEX | 844 | MOV | A,@R0 |
| 735 SPACE5: | | | 845 | CPL | A |
| 736 | CALL | LASER | 846 | ADD | A,#01 |
| 737 | CALL | LOCOMP | 847 | MOV | @R0,A |
| 738 | JZ | SPACEX | 848 | INC | R0 |
| 739 | CPL | A | 849 | MOV | A,@R0 |
| 740 | JZ | SPACEX | 850 | CPL | A |
| 741 SPACE6: | | | 851 | ADDC | A,#0 |
| 742 | MOV | A,R6 | 852 | MOV | @R0,A |
| 743 | MOV | R2,A | 853 | DEC | R0 |
| 744 | MOV | R0,#32 | 854 | JNZ | ZERSAF |
| 745 | STOP | TCNT | 855 | MOV | A,@R0 |
| 746 | DIS | TCNTI | 856 | JNZ | ZERSAF |
| 747 | MOV | A,R7 | 857 | MOV | @R0,#0FFH |
| 748 | JB3 | EXSPCE | 858 | INC | R0 |
| 749 | JMP | INSPCE | 859 | MOV | @R0,#0FFH |
| 750 EXSPCE: | | | 860 | DEC | R0 |
| 751 | CALL | TIMRES | 861 ZERSAF: | | |
| 752 | JMP | NOSTUK | 862 | RET | |
| 753 INSPCE: | | | 863 | | |
| 754 | MOV | A,T | 864 | ORG | 400H |
| 755 | CPL | A | 865 | | |
| 756 | ADD | A,#1 | 866 PRCT06: | | |
| 757 | MOV | @R0,A | 867 | MOV | A,R4 |
| 758 | MOV | R0,#61 | 868 | SWAP | A |
| 759 | MOV | A,@R0 | 869 | ANL | A,#0FH |
| 760 | MOV | R0,#33 | 870 | MOV | R0,#56 |
| 761 | CPL | A | 871 | MOV | @R0,A |
| 762 | ADDC | A,#0 | 872 | MOV | A,R5 |
| 763 | MOV | @R0,A | 873 | SWAP | A |
| 764 | CALL | TIMRES | 874 | MOV | R6,A |
| 765 | ANL | P2,#0FEH | 875 | ANL | A,#0F0H |
| 766 | MOVX | @R0,A | 876 | ORL | A,@R0 |
| 767 POTWAT: | | | 877 | MOV | @R0,A |
| 768 | IN | A,P1 | 878 | MOV | A,R6 |

| LINE | SOURCE STATEMENT | | LINE | SOURCE STATEMENT | |
|---|---|---|---|---|---|
| 769 | JB0 | POTWAT | 879 | ANL | A,#0FH |
| 770 | INS | A,BUS | 880 | INC | R0 |
| 771 | ORL | P2,#01H | 881 | MOV | @R0,A |
| 772 | SWAP | A | 882 | RET | |
| 773 | RR | A | 883 | | |
| 774 | RR | A | 884 PRCT12: | | |
| 775 | MOV | R6,A | 885 | MOV | A,R4 |
| 776 | ANL | A,#0FCH | 886 | SWAP | A |
| 777 | MOV | R0,#32 | 887 | RL | A |
| 778 | ADD | A,@R0 | 888 | ANL | A,#1FH |
| 779 | INC | R0 | 889 | MOV | R0,#56 |
| 780 | MOV | A,R6 | 890 | MOV | @R0,A |
| 781 | ANL | A,#03H | 891 | MOV | A,R5 |
| 782 | ADDC | A,@R0 | 892 | SWAP | A |
| 783 | JC | STUCK | 893 | RL | A |
| 784 NOSTUK: | | | 894 | MOV | R6,A |
| 785 | MOV | A,R7 | 895 | ANL | A,#0E0H |
| 786 | ANL | A,#0EFH | 896 | ORL | A,@R0 |
| 787 | MOV | R7,A | 897 | MOV | @R0,A |
| 788 | CLR | F1 | 898 | MOV | A,R6 |
| 789 | CPL | F1 | 899 | ANL | A,#1FH |
| 790 | JF0 | SETJMP | 900 | INC | R0 |
| 791 | JMP | NORMAL | 901 | MOV | @R0,A |
| 792 SETJMP: | | | 902 | RET | |
| 793 | JMP | SETNEW | 903 | | |
| 794 STUCK: | | | 904 PRCT25: | | |
| 795 | MOV | A,R7 | 905 | MOV | A,R4 |
| 796 | ORL | A,#30H | 906 | RR | A |
| 797 | ANL | A,#0F6H | 907 | RR | A |
| 798 | MOV | R7,A | 908 | ANL | A,#3FH |
| 799 | MOV | R0,#36 | 909 | MOV | R0,#56 |
| 800 | MOV | A,#2 | 910 | MOV | @R0,A |
| 801 | CALL | STKDWN | 911 | MOV | A,R5 |
| 802 | CLR | F1 | 912 | RR | A |
| 803 | CPL | F1 | 913 | RR | A |
| 804 | JF0 | STXJMP | 914 | MOV | R6,A |
| 805 | JMP | NORMLY | 915 | ANL | A,#0C0H |
| 806 STXJMP: | | | 916 | ORL | A,@R0 |
| 807 | JMP | SETNWX | 917 | MOV | @R0,A |
| 808 | | | 918 | MOV | A,R6 |
| 809 HICOMP: | | | 919 | ANL | A,#3FH |
| 810 | MOV | R6,A | 920 | INC | R0 |
| 811 | CPL | A | 921 | MOV | @R0,A |
| 812 | ADD | A,#1 | 922 | RET | |
| 813 | ADDC | A,R2 | 923 | | |
| 814 | JZ | SAMCHK | 924 | ORG | 700H |
| 815 | JNC | HLOGIC | 925 | | |
| 816 | CLR | A | 926 DISPLY | | |
| 817 | RET | | 927 | JF0 | HOLD |
| 818 HLOGIC: | | | 928 | IN | A,P1 |
| 819 | CPL | A | 929 | ANL | A,#0F0H |
| 820 | ANL | A,#0E0H | 930 | SWAP | A |
| 821 | JNZ | LEAVE | 931 | ORL | A,#0E8H |
| 822 SAMCHK: | | | 932 | JMPP | @A |
| 823 | CPL | A | 933 | | |

| LINE | SOURCE STATEMENT | | LINE | SOURCE STATEMENT | |
|---|---|---|---|---|---|
| 934 | ORG | 709H | 991 | BLANK: | |
| 935 | JMP | BLANK | 992 | ORL | P2,#20H |
| 936 | | | 993 | MOV | A,#0F0H |
| 937 | ORG | 711H | 994 | OUTL | BUS,A |
| 938 | MOV | R0,#37 | 995 | ANL | P2,#0DFH |
| 939 | MOV | R6,#2 | 996 | MOV | A,#80H |
| 940 | JMP | OUTPUT | 997 | MOV | R6,#6 |
| 941 | | | 998 | BLANK1: | |
| 942 | ORG | 719H | 999 | OUTL | BUS,A |
| 943 | MOV | R0,#35 | 1000 | DJNZ | R6,BLANK |
| 944 | MOV | R6,#2 | 1001 | JMP | LEDS |
| 945 | JMP | OUTPUT | 1002 | OUTPUT: | |
| 946 | | | 1003 | ORL | P2,#20H |
| 947 | ORG | 721H | 1004 | MOV | A,#0F0H |
| 948 | MOV | R0,#40 | 1005 | OUTL | BUS,A |
| 949 | MOV | R6,#3 | 1006 | ANL | P2,#0DFH |
| 950 | JMP | OUTPUT | 1007 | MOV | A,R6 |
| 951 | | | 1008 | XRL | A,#3 |
| 952 | ORG | 729H | 1009 | JZ | DIGIT |
| 953 | MOV | R0,#43 | 1010 | MOV | A,#80H |
| 954 | MOV | R6,#3 | 1011 | OUTL | BUS,A |
| 955 | JMP | OUTPUT | 1012 | OUTL | BUS,A |
| 956 | | | 1013 | DIGIT: | |
| 957 | ORG | 731H | 1014 | MOV | A,@R0 |
| 958 | MOV | R0,#47 | 1015 | SWAP | A |
| 959 | MOV | R6,#2 | 1016 | ORL | A,#0F0H |
| 960 | JMP | OUTPUT | 1017 | MOVP | A,@A |
| 961 | | | 1018 | OUTL | BUS,A |
| 962 | ORG | 739H | 1019 | MOV | A,@R0 |
| 963 | MOV | R0,#127 | 1020 | ORL | A,#0F0H |
| 964 | MOV | R6,#2 | 1021 | MOVP | A,@A |
| 965 | JMP | OUTPUT | 1022 | OUTL | BUS,A |
| 966 | | | 1023 | DEC | R0 |
| 967 | ORG | 741H | 1024 | DJNZ | R6,DIGIT |
| 968 | MOV | R0,#124 | 1025 | LEDS: | |
| 969 | MOV | R6,#2 | 1026 | MOV | A,R7 |
| 970 | JMP | OUTPUT | 1027 | OUTL | BUS,A |
| 971 | | | 1028 | OUTL | BUS,A |
| 972 | ORG | 750H | 1029 | CLR | F1 |
| 973 | HOLD: | | 1030 | MOV | R3,#01 |
| 974 | ORL | P2,#20H | 1031 | RET | |
| 975 | MOV | A,#0F0H | 1032 | | |
| 976 | OUTL | BUS,A | 1033 | DIVID2: | |
| 977 | ANL | P2,#0DFH | 1034 | CLR | C |
| 978 | MOV | A,#80H | 1035 | MOV | A,R6 |
| 979 | OUTL | BUS,A | 1036 | RRC | A |
| 980 | MOV | A,#0BEH | 1037 | MOV | R6,A |
| 981 | OUTL | BUS,A | 1038 | MOV | A,R5 |
| 982 | MOV | A,#9DH | 1039 | RRC | A |
| 983 | OUTL | BUS,A | 1040 | MOV | R5,A |
| 984 | MOV | A,#0B0H | 1041 | MOV | A,R4 |
| 985 | OUTL | BUS,A | 1042 | RRC | A |
| 986 | MOV | A,#0BDH | 1043 | MOV | R4,A |
| 987 | OUTL | BUS,A | 1044 | CLR | C |
| 988 | MOV | A,#80H | 1045 | RET | |
| 989 | OUTL | BUS,A | 1046 | | |
| 990 | JMP | LEDS | 1047 | CNTRES: | |

| LINE | SOURCE STATEMENT | | |
|---|---|---|---|
| 1048 | | MOV | R6,#10 |
| 1049 | | CLR | A |
| 1050 | | MOV | R0,#34 |
| 1051 | CNTRS1: | | |
| 1052 | | MOV | @R0,A |
| 1053 | | INC | R0 |
| 1054 | | DJNZ | R6,CNTRS |
| 1055 | MINRES: | | |
| 1056 | | MOV | R0,#125 |
| 1057 | | CLR | A |
| 1058 | | MOV | @R0,A |
| 1059 | | INC | R0 |
| 1060 | | MOV | @R0,A |
| 1061 | | INC | R0 |
| 1062 | | MOV | @R0,A |
| 1063 | | RET | |
| 1064 | | | |
| 1065 | | ORG | 7E8H |
| 1066 | | | |
| 1067 | | DB | 09H |
| 1068 | | DB | 41H |
| 1069 | | DB | 39H |
| 1070 | | DB | 11H |
| 1071 | | DB | 19H |
| 1072 | | DB | 21H |
| 1073 | | DB | 29H |
| 1074 | | DB | 31H |
| 1075 | | | |
| 1076 | | ORG | 7F0H |
| 1077 | | | |
| 1078 | | DB | 0FBH |
| 1079 | | DB | 0E0H |
| 1080 | | DB | 0EDH |
| 1081 | | DB | 0F5H |
| 1082 | | DB | 0E4H |
| 1083 | | DB | 0D7H |
| 1084 | | DB | 0DFH |
| 1085 | | DB | 0F0H |
| 1086 | | DB | 0FFH |
| 1087 | | DB | 0F7H |
| 1088 | | DB | 0FEH |
| 1089 | | DB | 9FH |
| 1090 | | DB | 0CBH |
| 1091 | | DB | 0BDH |
| 1092 | | DB | 0CFH |
| 1093 | | DB | 0CEH |
| 1094 | | END | |

ALMDON 0020  AVCALL 02E9  AVR
BOTBAD 01F6  CLOCK 0007  CNT

I claim:

1. Apparatus for inspecting moving spaced objects, comprising:
radiant energy means for directing radiant energy along a path towards the objects,
a sensor disposed with respect to the radiant energy means and the objects so as to receive radiant energy and produce an output proportional to the amount of radiant energy received, the amount of radiant energy received being dependent on the presence or absence of an object along the path of the radiant energy,
means for detecting a change in the sensor output due to the presence or absence of an object along the path of the radiant energy,
means for computing the lapse in time between successive detected changes in the sensor output,
means for periodically computing an average of said computations of said lapses in time,
means for periodically computing one or more thresholds in proportion to the average,
means for comparing a computed lapse in time with said one or more thresholds, and
means for actuating a container ejection mechanism based on the comparison of the computed lapse in time with said one or more thresholds.

2. Apparatus in accordance with claim 1 including means for comparing a computed lapse in time with at least one preset threshold based on the rate of motion of the objects and the spacing between successive objects.

3. Apparatus in accordance with claim 1 wherein said radiant energy means comprises a laser.

4. Apparatus in accordance with claim 1 wherein said radiant energy means and said sensor are disposed at a plane proximate the heel portions of said objects.

5. Apparatus for detecting down containers in a procession of containers comprising:
radiant energy means for directing radiant energy along a path towards said procession,
a sensor disposed with respect to said radiant energy means and said procession so as to receive radiant energy and produce an output proportional to the amount of radiant energy received, the amount of radiant energy received being dependent on the presence or absence of a container along the path of the radiant energy,
means for detecting successive changes in the sensor output due to the presence of a container along the path of the radiant energy,
means for computing the lapse in time between said successive detected changes in the sensor output,
means for periodically computing an average of said computations of said lapses in time,
means for periodically computing at least one threshold based on the average,
means for comparing a computed lapse in time with said threshold, and
means for actuating a container ejection mechanism based on the comparison of said computed lapse in time with said threshold.

6. Apparatus in accordance with claim 5 wherein said radiant energy means comprises a laser.

7. Apparatus in accordance with claim 5 wherein said radiant energy means and said sensor are disposed in a plane proximate the heel portions of the containers.

8. Apparatus for detecting stuck containers in a procession of containers, comprising:
radiant energy means for directing radiant energy along a path toward said procession,
a sensor disposed with respect to said radiant energy means and said procession so as to receive radiant energy and produce an output proportional to the amount of radiant energy received, the amount of radiant energy received being dependent on the presence or absence of a container along the path of the radiant energy, means for detecting successive changes in the sensor output due to the presence of a container along the path of the radiant energy, means for computing the lapse in time between successive detected changes in said sensor output, means for periodically computing an average of said computations of said lapses in time, means for periodically computing a threshold based on said average, means for comparing a computed lapse in time with said threshold, and means for actuating a container ejection mechanism based on the comparison of said computed lapse in time with threshold.

9. Apparatus in accordance with claim 8 wherein said radiant energy means comprises a laser.

10. Apparatus in accordance with claim 8 wherein said radiant energy means and said sensor are disposed in a plane proximate the heel portions of the containers.

11. Apparatus for detecting stuck containers in a procession of containers, comprising:

radiant energy means for directing radiant energy along a path towards said procession, a sensor disposed with respect to said radiant energy means and said procession so as to receive said radiant energy and produce an output proportional to the amount of radiant energy received, the amount of radiant energy received being dependent on the presence or absence of a container along the path of the radiant energy, means for detecting successive changes in the sensor output due to the absence of a container along the path of the radiant energy, means for computing the lapse in time between successive detected changes in said sensor output, means for comparing a computed lapse in time with a preset threshold which is based on the rate of motion of the procession and on the spacing between containers in said procession, and means for actuating a container ejection mechanism based on the comparison of said computed lapse in time with said preset threshold.

12. Apparatus in accordance with claim 11 wherein said radiant energy means comprises a laser.

13. Apparatus in accordance with claim 11 wherein said radiant energy means and said sensor are disposed in a plane proximate the heel portions of the containers.

14. Apparatus for detecting down or stuck containers in a moving procession of containers, comprising:

radiant energy means for directing radiant energy along a path transverse to the path of movement of the containers, a sensor disposed with respect to said radiant energy means and said procession so as to receive radiant energy and produce an output proportional to the amount of radiant energy received, the amount of radiant energy received being dependent on the presence of absence of a container along the path of radiant energy, means for generating a binary signal having transitions corresponding to changes in output of said sensor due to the presence or absence of a container along the radiant energy path, means for computing a first lapse in time between successive transitions in said binary signal due to the presence of a container along the radiant energy path, means for computing a second lapse in time between successive transitions in said binary signal due to the absence of a container along the radiant energy path, means for periodically computing an average of said computations of lapse in time between successive transitions in said binary signal due to the presence of containers along the radiant energy path, means for periodically computing at least one threshold in proportion to the computed average, means for comparing said first lapse in time with said threshold based on said average, means for comparing said second lapse in time with a preset threshold, and means for actuating a container ejection mechanism based on the comparison of each computed lapse in time with said thresholds.

15. Apparatus in accordance with claim 14 wherein said preset threshold is operator adjustable.

16. Apparatus in accordance with claim 14 wherein said radiant energy means comprises a laser.

17. Apparatus in accordance with claim 14 wherein said radiant energy means and said sensor are disposed in a plane proximate the heel portions of the containers.

18. Method of inspecting a procession of containers, comprising:

scanning said containers at a predetermined elevation with radiant energy, generating a binary signal having successive transitions of a first sense and a second sense based on said scanning step, the spacing in time between a transition of a first sense followed by a transition of a second sense being proportional to a dimension of a container at said predetermined elevation, and the spacing in time between a transition of a second sense followed by a transition of a first sense being proportional to the separation between adjacent containers, computing the spacing in time between said successive transitions, comparing a computed spacing in time proportional to a dimension of a container to at least one threshold, comparing a computed spacing in time proportional to the separation between adjacent containers to another threshold, and actuating a container ejection mechanism based on the comparison of the computed spacings in time with said thresholds.

19. Method according to claim 18 including periodically computing an average of successive computations of said spacings and varying said at least one threshold in proportion to said average.

20. Method according to claim 18 including presetting said another threshold.

21. Method according to claim 18 wherein said scanning step includes continuously moving said procession and directing a laser beam at the procession at said predetermined elevation.

* * * * *